UNITED STATES PATENT OFFICE.

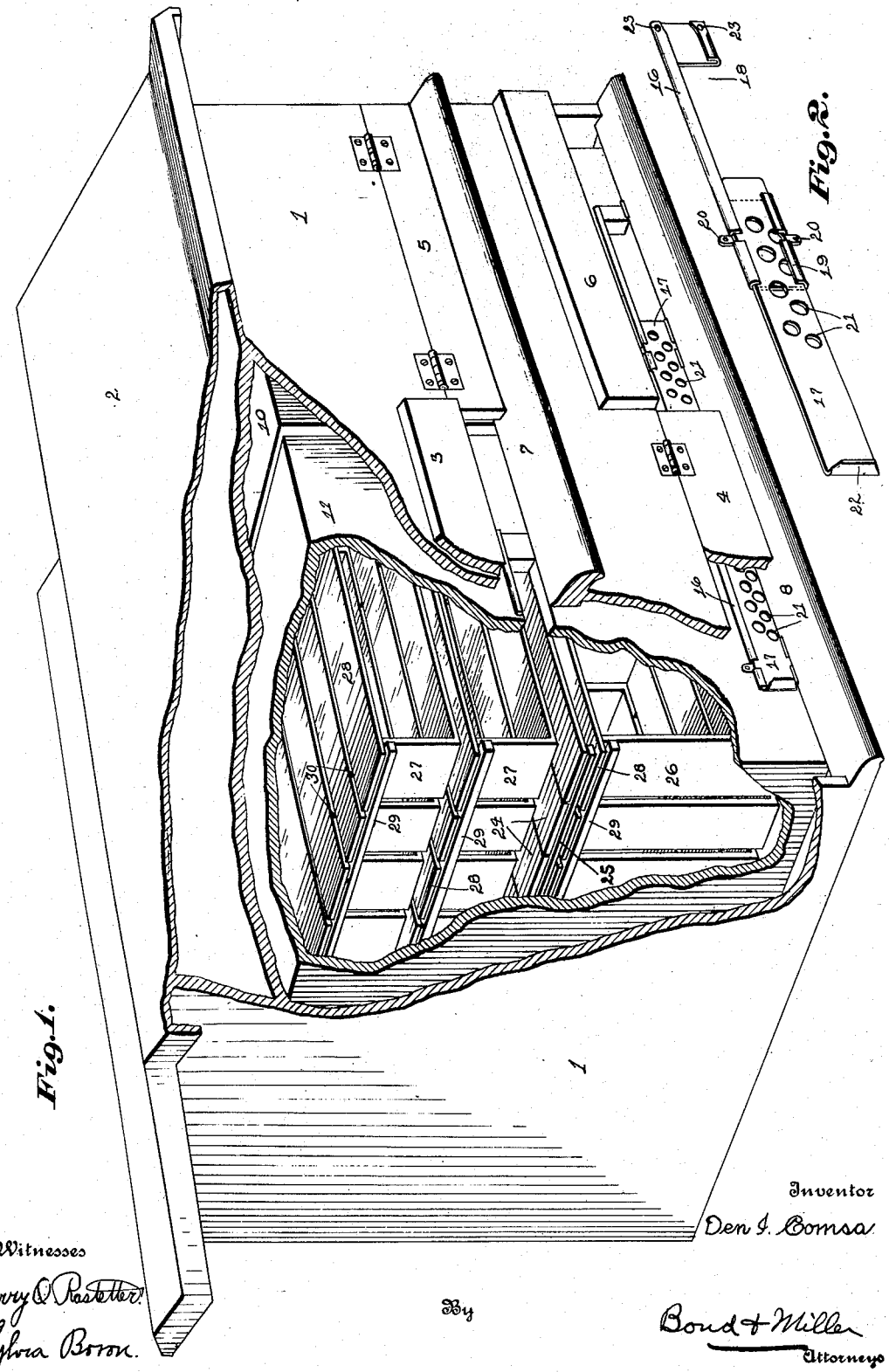

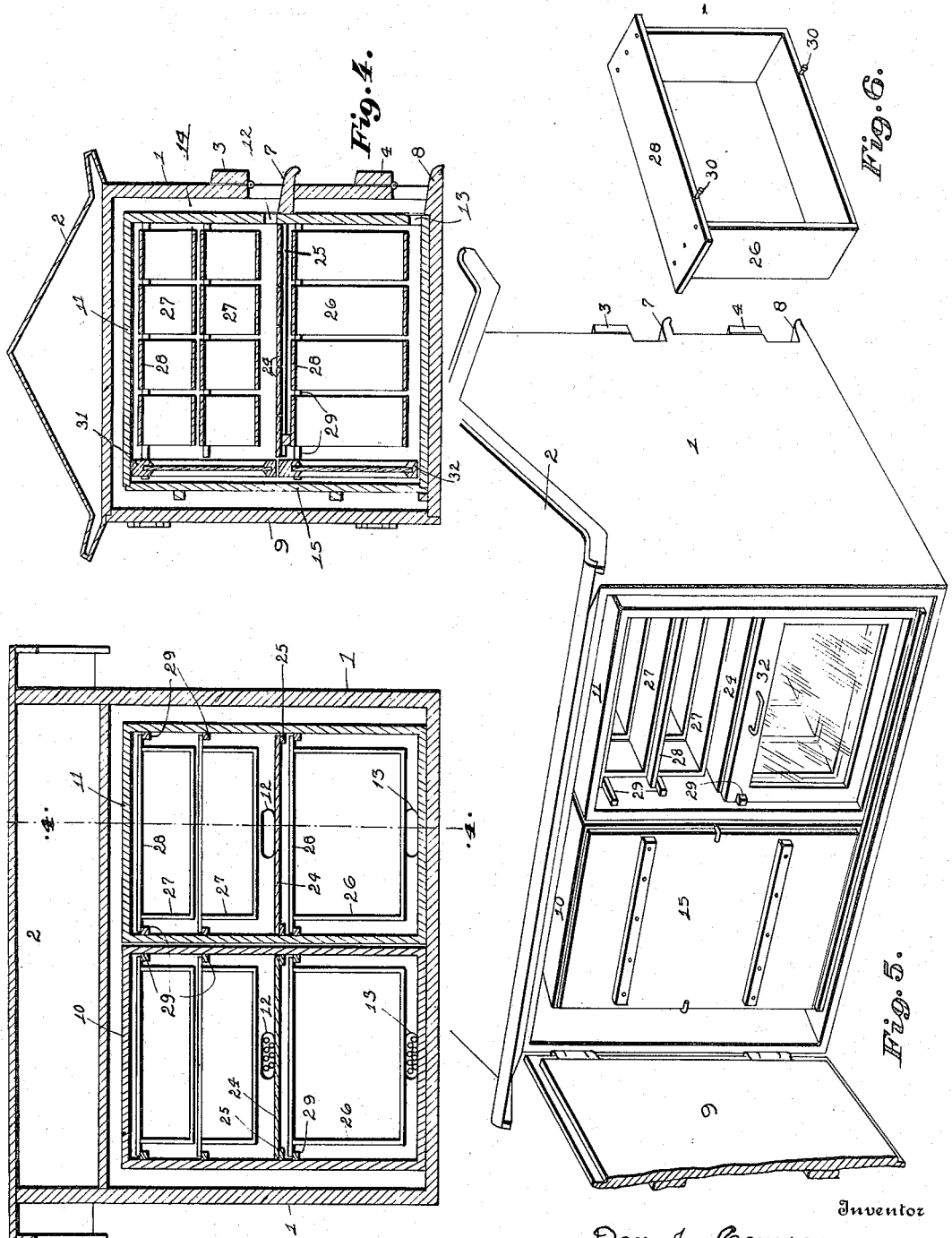

DEN I. COMSA, OF SALEM, OHIO.

BEEHIVE.

936,604. Specification of Letters Patent. Patented Oct. 12, 1909.

Application filed November 3, 1908. Serial No. 460,930.

*To all whom it may concern:*

Be it known that I, DEN I. COMSA, a subject of the King of Roumania, residing at Salem, in the county of Columbiana and State of Ohio, have invented a new and useful Beehive, of which the following is a specification.

My invention relates to improvements in the construction of bee hives and especially of that class of hives in which an outer shelter house, and a separable inner bee box are provided; and the objects of my improvement are, first to provide a hive which will afford proper protection to the bees from extremes of temperature, from the weather, and from other sources of injury; second, to reduce the space required for the proper hiving of a large number of bees; third, to so arrange the bee boxes, with reference to the shelter house, that they may be removed therefrom and rearranged or other boxes substituted in their places without disturbing the shelter house; and fourth, to provide a hive for bees so constructed that the bees may be most effectively managed and kept at work in the most orderly and satisfactory manner with a minimum amount of inconvenience to the bee keeper and with practically no disturbance to the bees. I attain these objects by the construction illustrated in the accompanying drawings, in which—

Figure 1, is a perspective view of a hive constructed in accordance with my invention and consisting of a shelter house arranged for two bee boxes, a portion of the shelter house and of one of the bee boxes being cut away to show the arrangement of the interior and construction of the parts. Fig. 2 is an enlarged detached perspective view of one of the shutters used upon the bee boxes. Fig. 3 is a vertical longitudinal sectional view through the hive, the said view looking toward the front of the same. Fig. 4 is a transverse vertical sectional view taken on a plane cutting the hive on the line 4—4, of Fig. 3. Fig. 5 is a perspective view from the rear of the hive, one of the outer doors being removed and the other being opened and partly cut away and the back and upper glass frame of one of the bee boxes being removed to more fully disclose the internal construction. Fig. 6 is a perspective view of one of the comb frames.

Throughout the several views similar numerals of reference indicate similar parts.

The shelter house 1 consists of a strongly built box or shed provided with bottom, sides, ends and top, with a roof 2, arranged thereon, said roof being preferably of the design illustrated, covered with some water proof material, and adapted to turn the rain and carry it off to the ends of the shelter house.

It should be stated that the shelter house is sometimes constructed of such size and arrangement that a large number of bee boxes may be accommodated. In the hive shown in the drawings the shelter house is designed for two bee boxes. Upon the front side of the shelter house are arranged the slat-like doors 3, 4, 5 and 6, which are hinged to the shelter house in such way that they may be lifted to open the door-way as in the case of the doors 3 and 6 in Fig. 1, or may be lowered to the position of the doors 4 and 5 in Fig. 1, thereby closing the door-ways. The upper and lower ledges 7 and 8 are adapted for alighting boards for the bees, and extend somewhat inwardly and outwardly from the front side of the shelter house.

The rear of the shelter house is provided with doors such as 9, swinging upon hinges or otherwise conveniently arranged so that the entire back of the shelter house may be readily opened.

The bee boxes 10 and 11 are each provided upon the front side with openings 12 and 13 for the entrance and exit of bees. These openings are so arranged that their bottom edges are practically on a plane with the upper surfaces of the ledges 7 and 8 respectively. The ledge 7 extending back from the front of the shelter house engages the front side of the bee box thus holding it spaced from the front of the shelter house and producing the air space 14. The bee box or boxes are also sufficiently less in dimension than the interior of the shelter house to produce similar air spaces on all sides and at the top. At the rear of the bee box a removable back 15 is provided which may be fastened in place by any suitable means or entirely removed. Each of the openings 12 and 13 is provided with a shutter constructed of sheet metal or other suitable material and consisting of a guide 16 and a perforated slide 17. The guide 16 is produced by cutting out from a strip of metal a broad rectangular notch 18 and folding over the edges of the said strip 19 leaving the ears 20 flat with the back of the guide and adapted for attachment to the bee box as illustrated in Figs. 1 and 2. The perforations 21 in the slide are of such diameter that a single bee may barely pass through one of said perforations. The perforated slide 17 is provided with a rectangular portion 22 for convenience in grasping the said slide in moving it in the guide 16. The fastening nails 23 close down the guide way 16 at that point in such way as to provide a stop for the slide 17. In Fig. 1 the bee box 11 is shown with the lower opening closed by the slide 17 so that mice cannot enter the bee box, and also for the purpose of keeping out any undue amount of cold air in winter, while the slide on the bee box 10 is open in the position to allow the free entrance and exit of a large number of bees while working.

The interior of each bee box is divided into an upper and a lower portion by means of a floor composed of removable slats 24 supported at their ends upon strips 25 attached to the sides of the bee box. The slats 24 are transversely arranged and any one of said slats may be lifted out or moved partially out of place so as to produce an opening between the adjacent slats. It should be stated that the upper surface of the slats 24 is approximately on a plane with the lower edge of the opening 12, so that the opening 12 may be considered the entrance for the upper portion of the bee box, while the opening 13 is provided for the lower portion. By means of the shutter on the bee box and the hinged doors upon the shelter house access may be given to the upper or the lower portion of the bee box or to both if desired.

I prefer to arrange the comb frames as shown in the drawings, large frames, 26, in the lower portion and smaller frames, 27, in the upper portion of the bee box, but other suitable arrangements may be suggested. Each comb frame is constructed in the manner shown in Fig. 6 having a top side 28 which extends beyond the ends forming means for hanging the frames upon the strips 29, which are fastened along the inner side of the bee box. The edges of the sides and ends of the comb frame are straight and not cut away as is usually the practice, thus producing a frame, the edges of which are in planes so that the bees will be induced to build the comb out to the edge of the frame and fill the said frame up to the edges at all points thus producing a more perfect comb of honey. In order to separate the frames from each other as they hang upon the strips 29, and thus leave room between adjacent frames for the entrance, working and exit of bees the pins 30 are provided, which extend out from the edge of the top and bottom of the frame, each frame being provided with pins upon the edges of one side only and extending for sufficient distance to produce the necessary space between the said frame and the adjacent frame.

Upon the inside of the bee box and at the back of the last comb frames are hung upon the strips 29 the glass-frames 31 and 32 consisting of wooden frames with glass centers through which the interior of the bee box, the condition of the comb frames and the working of the bees may be observed without great disturbance. The back 15 is intended to close the bee box, and it is only when the said back is removed that the interior may be observed through the said glass.

In successful and practical bee culture for profit it is essential that the bee keeper have at all times opportunity of knowing the condition of the interior of the hive, the progress of the work and other facts regarding the life history of the bees themselves. It is also essential that it be possible to control the working of the bees and to move them to new comb frames when it is desired and to prevent the too frequent swarming of the bees by the timely removal of queen bees as it is the practical object to maintain active work on the part of the bees as much of the time as possible. These practical features are regarded in the present invention. The bees may be kept in the lower portion of the bee box until the frames in said portion have been filled or until for some other reason it is desired to transfer them to the upper portion, at which time one of the slats 24 in the floor is removed, the particular slat to be removed depending upon the location of the work of the bees in the lower portion. The upper door should be opened and the lower shutter and door closed at this time, and the bees will gradually become accustomed to working in the upper portion of the bee box, and use the upper opening 12 for entrance and exit. The change is thus produced very gradually and without discomfort or annoyance to the bees and without interrupting the work to any appreciable extent. When all of the bees have been thus transferred to the upper portion the slat in the floor may be returned to its place and the bees not permitted to enter the lower portion until it is again desired to move them.

To those skilled in the art the advantages of the improvement herein described will be readily apparent and it will be seen that all of the objects of this invention are fully attained.

I claim—

1. A bee hive comprising an outer shelter house and an inner removable bee box arranged with air space between said shelter house and said bee box upon four sides and the top thereof, the said bee box divided into upper and lower portions and provided with openings leading into the upper and lower portions of said bee box respectively and means for closing said openings, substantially as and for the purpose specified.

2. A bee hive comprising an outer shelter house and an inner removable bee box spaced from the walls of said shelter house, said bee box divided into upper and lower portions and provided with openings leading into said upper and lower portions respectively and upper and lower ledges or alighting boards arranged in door-ways in the shelter house extending inwardly and outwardly from the front of said shelter house, the said ledges so located as to be immediately below the opening in said bee box, substantially as and for the purpose specified.

3. A bee-hive comprising an outer shelter house and an inner removable bee box, the said bee box being divided into upper and lower portions by means of a floor composed of removable slats, and said shelter house and bee box provided with openings leading to said upper and lower portions of the bee box respectively.

4. A bee hive comprising an outer shelter house provided on the front side with upper and lower slat-like door-ways and doors and upper and lower ledges or alighting boards arranged in said door-ways and provided at the rear with doors for the entire back of the shelter house and a removable bee box arranged within said shelter house and spaced from the walls thereof and openings in said bee box corresponding with said slat-like door-ways and upper and lower ledges.

5. The herein described bee hive comprising an outer shelter house and an inner removable bee box, said bee box divided into upper and lower portions by means of a floor composed of removable slats, said bee box provided with upper and lower openings leading to said upper and lower portions, upper and lower glass frames arranged at the rear of said upper and lower portions, and a back for said bee box adapted to be removed therefrom, substantially as and for the purpose specified.

6. The herein described bee hive comprising an outer shelter house and an inner removable bee box, said bee box divided into upper and lower portions by means of a floor, and also provided with openings leading into said upper and lower portions respectively, and shutters consisting of guides and perforated slides arranged at said openings, substantially as and for the purpose specified.

7. In a bee hive of the class described, a shutter adapted to be located over the opening in a bee box, said shutter comprising a guide with turned over, slide-engaging edges and integral ears adapted for attachment to said bee box, a perforated slide located in said guide and between the said slide-engaging edges and adapted to be moved longitudinally within said guide, whereby the said perforated slide may be brought over the opening in said bee box, substantially as and for the purpose specified.

In testimony that I claim the above, I have hereunto subscribed my name in the presence of two witnesses.

DEN I. COMSA.

Witnesses:
G. M. THOMAS,
E. E. HANNA.